3,442,832
REINFORCED RUBBER BY COPRECIPITATION WITH STARCH XANTHANE OR PREGELATINIZED STARCH
Russell A. Buchanan and Charles R. Russell, Peoria, Ill., and Orville E. Weislogel, Orlando Air Force Base, Orlando, Fla., assignors to the United States of America as represented by the Secretary of Agriculture
No Drawing. Filed Sept. 19, 1966, Ser. No. 580,555
Int. Cl. C08c 9/12; C08d 9/06
U.S. Cl. 260—17.4                                         6 Claims

ABSTRACT OF THE DISCLOSURE

White high tear and tensile strength rubber is prepared from natural or synthetic latices by adding major amounts of gelatinized starch or starch xanthate and coprecipitating, with high efficiency, readily filterable curds by adding salts, drying, milling with pigment and additives, and vulcanizing. The unexpected properties are attributed to phase reversal resulting in continuous rubber phase. The process is also well adapted to incorporation of lignin as a filler by coprecipitation from aqueous phase.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to the quite unobvious discovery that fairly transparent to brilliantly white or pastel-tinted but mechanically astonishing rubbers can be prepared without the incorporation of carbon black or lignin reinforcing agents, the necessary omission of which intensely dark reinforcing components from the white portion of whitewall tires has resulted in the very well recognized weakness of whitewall rubber.

More specifically, this invention relates to the discovery that nonblackened natural and synthetic rubbers capable of white pigmentation or pastel coloration but having mechanical strength properties comparable to or even exceeding those obtained heretofore only in the black sidewall rubbers can be produced by adding to the elastomeric latex a colloidal dispersion of a cereal grain polysaccharide such as pregelatinized starch, pregelatinized flour, or a starch ester such as starch xanthate or pregelatinized commercial cationic starch, coprecipitating the intimately dispersed polysaccharide and elastomer in the form of easily dewatered and dried crumbs with a white-promoting acidic salt, e.g., $ZnCl_2$, masticating and milling the dried crumbs in the presence of white pigments such as zinc oxide or titanium dioxide or an organic dye plus conventional rubber additives, including vulcanizing agents, lubricants, and antioxidants and vulcanizing the resulting slab rubber in conventional manner.

Another industrially beneficial aspect of our invention is the discovery that the incomplete coprecipitations of even particularly difficult elastomers such as styrene-butadiene rubber from latices containing conventional rubber reinforcing agents such as carbon black or the much less precipitable and therefore now largely abandoned lignins are made essentially quantitative when the coprecipitations are conducted in the presence of added starch xanthate or pregelatinized starch or pregelatinizied flour. Similarly, we have also found that there is no costly loss of rubber fines when the latex to be coprecipitated also contains at least about 10 parts based on the rubber of the dispersed starch xanthate or pregelatinized starch or flour.

Yet another unobvious facet of our invention is the discovery that rubbers exhibiting unquestionably synergistic increases in strength properties are obtained when the crumb rubber is obtained as the coprecipitate from a latex containing a mixture of both the intimately dispersed cereal polysaccharide additive and carbon black or lignin, preferably in approximately equal proportions.

Thus, our invention relates primarily to the discovery that white pigmented or pastel tinted rubber stocks having the previously unapproached strength characteristics and mechanical properties of black sidewall rubber is provided by the mastication, milling, and vulcanization of well-dried polysaccharide-containing crumb rubber precipitated by zinc chloride, zinc sulfate, or other mineral acid salt of a divalent metal, from a milky latex comprising an intimate mixture of the natural or synthetic elastomer and based on the dry weight of the elastomer an essentially colloidal dispersion containing about 7 parts to about 100 parts by weight of the starch xanthate or pregelatinized cereal grain polysaccharide material.

The superb tensile and tear strengths and other mechanical properties of carbon black reinforced tire tread and sidewall rubber are too well known to require elaboration. It is also a matter of common recognition that the white sidewall area of a whitewall tire, necessarily containing not more than a trace of the unmaskable carbon black reinforcing agent, is sorely deficient in strength attributes and is easily damaged by even slight contact with curbings, etc. The same limitation, of course, pertains to the newly popularized red or pastel dyed trim of sports car tires.

The relatively poor strength properties of presently available whitewall rubber and the continued failure of highly skilled research staffs to solve this well known problem is given mute testimony not only by the grudging use of white colored slip-on rings and by the invention of tires having annular grooves for receiving recessed and thereby partially protected replaceable white rubber inserts as described in U.S. Patent No. 3,258,050, but even more eloquently by the deliberately nonabrupt incremental narrowings of the formerly very conspicuous white area of the tire sidewall to nothing more than a vestigial annulus having a width of only about 5/8 inch.

The primary object of our invention is a process for preparing greatly strengthened natural or synthetic rubber without the use of carbon black, lignin, or other darkly colored reinforcing agents, more than traces of which cannot be used for white rubber.

Another object is the preparation of brilliantly white rubber having tensile, elongation, tear, and other strengths comparable to those shown by the carbon black-reinforced tire rubbers.

Another object is the production of carcass grade rubber wherein all or at least a substantial proportion of the costly carbon black reinforcing agent is substituted by a distinctly low cost flour or starch material in colloidally dispersed form.

Yet another object is the discovery that a synergistic reinforcement occurs in rubber containing certain mixtures of intimately dispersed carbon black or lignin and a pregelatinized cereal flour or starch to provide vulcanized rubber having greater strengths than are provided by an equivalent addition of either reinforcing agent alone.

Still another object is a process for preventing the costly loss of fines that occurs especially in the coagulation of styrene-butadiene rubber or of lignin from latices thereof.

Other and related objects and advantages of our invention will become apparent in the course of the following detailed specification and claims.

Although a variety of patents on the incorporation of cereals, flour, and starches into rubber have appeared in the very many years since Gerner, U.S. Patent No. 229,817, first taught vulcanizing a mixture of gum rubber, sulfur, and a cereal flour extender, the undeniable failure of the otherwise highly sophisticated rubber industry to solve the whitewall problem clearly indicates the unobviousness of our invention.

Collardon, U.S. Patent No. 1,098,882, teaches the forming of a pliable mass by mixing a small proportion of coagulated (gum) rubber with a relatively large proportion of almost dry cellulose xanthate, sheeting the mass between heated rollers, insolubilizing the cellulose by dealkalization, mixing the rubber-containing cellulose with sulfur and another variety of rubber, and vulcanizing the mixture to produce artificial leather, linoleum, ebonite, or similar hard, black, inelastic, water resistant rubbers useful in the manufacture of fountain pen barrels, electric insulators, handles, combs, etc. Furthermore, Collardon's teaching that the addition of rubber to a cellulose ester decreases the sensitivity of the latter to water conversely suggests that the addition of a cellulose ester to rubber would produce a water sensitivity in the latter. Since starch esters are known to be much more water soluble than cellulose esters, it would not be reasonable to substitute a starch ester for the preparation of tire rubber that will be exposed to persistent rainfall and inclement weather.

Brown et al., U.S. Patent No. 1,431,455, teaches that fabrics are made water resistant by impregnating the fabric with the solution formed by adding viscose to rubber dispersed in an organic solvent and then vulcanizing the cellulose-containing rubber in the impregnated fabric. The patent also teaches that increased proportions of the cellulose xanthate reactant markedly lower the elasticity of the coating. It is apparent that Brown et al., like Collardon, fail to suggest the substitution of starch xanthate either for their purpose or for the preparation of rubber in which good elasticity and greatly improved strength are required.

Biddle, U.S. Patent No. 1,762,153, is directed to a process for chemically stabilizing a starch-containing latex, the water sensitive coagulum of which must be insolubilized with formaldehyde. The mere teaching that starch may be incorporated in rubber has no relevance to the reinforcement requirements of the instant invention.

Schur, U.S. Patent No. 1,986,367, prepared artificial leathers by impregnating fibrous webs with a rubber latex containing only a very small incorporation of viscose. Larger incorporations of the cellulose xanthate gave brittle products having substantially no tear resistance. Furthermore, as compared with a 75 percent absorption value for a control web impregnated with a simple rubber latex, the leather made with the viscose-containing latex disadvantageously absorbed 103 percent of its own weight of water in 24 hours despite the achieved reduction in permanent stretch value and increased wet tensile and wet stretch values.

Holmberg, U.S. Patent No. 2,018,524, is directed to nonflaking carpet backing or sizing compositions that avoid the cracking and dusting tendencies of the then already known backings from equal mixtures of boiled starch and rubber latex, which previously known mixtures he believes to be dust prone by the presence of amylopectin as a continuous phase enveloping the rubber particles. Holmberg's flexible backings are prepared by mixing a major proportion of ungelatinized starch or flour into latex containing a relatively minor proportion of rubber solids along with agents for in situ vulcanization on the impregnated fibrous web, whereby the rubber is prevented from becoming the discontinuous phase. Thus, Holmberg in effect teaches that pregelatinized cereal grain carbohydrate additions to rubber cause brittleness and virtually complete loss of strength.

Ball, U.S. Patent No. 2,161,445, teaches that hydrocarbon resistant rubber is prepared by adding a colloidal dispersion of starch or dextrin to a rubber latex, drying by evaporation plus vacuum drying, breaking and softening the resulting horny material by milling and grinding, and then mixing the rubber containing the colloidal starch into starch-free rubber and vulcanizing the whole. The patent expressly teaches that additions of starch, dextrin, and colloidal conversion products of starch to rubber decrease the tensile strength of the vulcanized product, which result is conspicuously opposite to that of the present invention.

Fuetterer, U.S. Patent No. 3,113,605, masticates a finely powdered starch or dextrin and an inorganic salt into a carbon black reinforced tread stock to provide antiskid properties on wet or icy roads.

Rogers, U.S. Patent No. 3,107,225, teaches, not surprisingly, that the stiffness and load supporting capacity (compression strength) of foam rubber structures is increased by the addition to the unfoamed mix of an ungelatinized or gelatinized ester or ether of starch, amylose, amylopectin, etc., followed by foaming, gellation, and vulcanization of the gelled foam.

As will be clearly shown in the following illustrative examples and tables, we have now discovered that perfectly white or pastel-dyed vulcanized rubber stocks that contain no unmaskable carbon black and which, nevertheless, exhibit greatly improved mechanical properties including tensile strength, percent elongation, and tear values, which reinforced properties that are fully comparable to or even superior to those of conventional black sidewall rubber that is reinforced with a large amount of a costly special grade of reinforcing black are prepared by homogenously adding to a latex of either natural rubber or to a latex of a synthetic elastomer such as styrene-butadiene rubber (SBR), nitrile rubber ("Chemigum 236," Goodyear's T.M. for a nitrile rubber latex), or of a chlorinated rubber, a colloidal solution of starch xanthate or of a pregelatinized polysaccharide such as gelatinized wheat flour or starch or an aminated derivative such as "Cato-8," (a cationic starch available from National Starch Co., New York city) adding zinc sulfate or equivalent mineral acid salt to quantitatively coprecipitate exceptionally filterable crumbs comprising an intimate mixture of elastomer particles and colloidal cereal grain-derived particles, thoroughly masticating the oven-dried crumbs in the optional presence of added titanium dioxide or zinc oxide pigment and conventional vulcanization aids including a sulfur source, accelerator, lubricant, and antioxidant, thereby also causing a phase reversal in which the rubber particles become the continuous rather than the discontinuous phase. Subsequent sustained heating of the brilliantly white slabs not only vulcanizes the rubber particles but apparently simultaneously also causes extensive hydrogen bonding or crosslinking of the polysaccharide particles to the rubber particles thereby insolubilizing the polysaccharide so that the finished rubber is highly resistant not only to oil and organic solvents but also to water.

EXAMPLE 1

3000 g. of an aqueous 10% solution of 0.08 D.S. starch xanthate was added to 1640 g. of commercially obtained ASTM Type I natural rubber latex containing 61.5% (1009 g.) of latex solids which were preserved with ammonia. After 30 minutes of high-speed stirring, the mixture was diluted with 2000 ml. water. The solids were quantitatively coprecipitated as filterable curds by the addition of 849 ml. of M zinc sulfate solution, i.e., 84.06 ml. of $ZnSO_4$ solution per 100 g. of rubber solids, the $ZnSO_4$ being equivalent to 6.9 g. of ZnO per 100 g. of rubber solids. After filtering the precipitated curds and drying them overnight in an air oven, the dry curds were thoroughly masticated before and again following the addition of 243.4 g. of ZnO (31.0 g. minus 6.9 g. per 100 g. rubber), 151.5 g. of $TiO_2$ (15 g. per 100 g. rubber)

and conventional curing and vulcanizing agents as tabulated below. The compounded rubber was then vulcanized at 300° F. for 20 minutes in a molding press. For purposes of comparison we used the same natural rubber latex but without any starch xanthate to prepare a fully conventional white sidewall specimen in which the sole and very nominal reinforcement effect was that of the per se addition of zinc oxide pigment. Although the addition of $ZnSO_4$ was identical to that of the experimental preparation, the subsequent addition of ZnO per se to the dried curds was 738.3 g. (80.0 g. minus 6.9 g. per 100 g. rubber solids), which corresponds to the conventional level of this sole or at least almost exclusive reinforcing agent used in conventional white sidewall rubber. The commercial level of $TiO_2$ (25 g. per 100 g. of rubber) was employed in the formulation of this conventional rubber. The appearance and particularly the whiteness of the two vulcanized rubbers being indistinguishable to the eye, it is apparent that very significant economies are achieved, not only as to the zinc oxide but especially as to the quite costly titanium dioxide.

TABLE I

| | Type I Natural Rubber | |
|---|---|---|
| | Conventional Zinc Oxide Reinforced, Parts by Wt. | Starch Xanthate Reinforced, Parts by Wt. |
| Compound: | | |
| Natural rubber | 100.0 | 100.0 |
| Stearic acid | 2.0 | 2.0 |
| Zinc sulfate (corresp. to 6.9 parts zinc as the oxide) | 14.6 | 14.6 |
| Zinc oxide | 73.1 | 24.1 |
| Starch xanthate, starch basis | | [1] 30.0 |
| Polyalkyl polyphenol, antioxidant | 1.0 | 1.0 |
| Titanium dioxide, pigment | 25.0 | 15.0 |
| Sulfur | 3.0 | 3.0 |
| Benzothiazyl disulfide | 1.5 | 1.5 |
| Total Weight | 212.5 | 183.5 |
| Total Volume | 135.3 | 143.9 |
| Press cure, 20 minutes at 300° F | Yes | Yes |
| Physcial properties: | | |
| Modulus, 300% elongation, p.s.i | 448 | 1,240 |
| Tensile strength, p.s.i | 2,480 | 2,430 |
| Ultimate elongation, percent | 640 | 465 |
| Hardness, Shore A | 38 | 55 |
| Angle tear, lbs./in | 153 | 172 |
| Whiteness | [2] | [2] |

[1] 32 minus 2.
[2] Intense white.

EXAMPLE 2

White styrene-butadiene rubber having strength values closely resembling those of commercial black sidewall S-B rubber containing SRF black (semi-reinforcing furnace black) was prepared by mixing 4500 g. of the same 10% starch xanthate solution of Example 1 with 2320 g. of commercially obtained Type 2000 SBR latex containing 43.0% solids (997.6 g.). The thoroughly stirred mixture was diluted with 3 liters water and coprecipitated with 841 ml. of M $ZnSO_4$ solution. The oven-dried crumb rubber was masticated and compounded with 13.2 g. of ZnO, 25 g. $TiO_2$ pigment, and the other additives shown in Table II, all being based on 100 g. of the SBR solids, and then press vulcanized at 300° F. for 30 minutes to provide brilliantly white synthetic rubber sheets.

For comparison, a conventionally reinforced black rubber was prepared by compounding per 100 g. of commercially supplied gum from Type 2000 SBR with 5 g. ZnO, 45 g. SRF black, and the other agents shown in Table II. The table also shows that the mechanical strengths of the white rubber of our invention are generally better than those of the furnace black-reinforced synthetic rubber.

TABLE II

| | SBR Rubber | |
|---|---|---|
| | Conventional Black, Parts by Wt. | White, Starch Xanthate-Reinforced, Parts by Wt. |
| Compound: | | |
| SBR rubber | 100.0 | 100.0 |
| Stearic acid | 2.0 | 2.0 |
| Zinc oxide | 5.0 | 20.0 |
| SRF black | 45.0 | |
| Starch xanthate, starch basis | | 45.0 |
| Polyalkyl polyphenol, antioxidant | 1.0 | 1.0 |
| Titanium dioxide, pigment | | 25.0 |
| Sulfur | 2.0 | 2.0 |
| Benzothiazyl disulfide | 1.5 | 1.5 |
| Tetramethylthiuram disulfide | 0.2 | 0.2 |
| Total Weight | 156.7 | 196.7 |
| Total Volume | 139.4 | 153.5 |
| Press cure: 30 minutes at 300° F | | |
| Physical properties: | | |
| Modulus, 300% elongation, p.s.i | 1,065 | 1,134 |
| Tensile strength, p.s.i | 1,785 | 1,305 |
| Elongation, percent | 430 | 345 |
| Hardness, Shore A | 54 | 76 |
| Angle tear, lbs./in | 115 | 131 |
| Appearance | [1] | [2] |

[1] Black.
[2] Very white and bright.

EXAMPLE 3

To compare a fully operative species of our invention with similar but essentially inoperative counterparts, we prepared a series of six SBR stocks described as follows and in Table III.

Stock A (control) was SBR gum rubber vulcanized with conventional additives but containing no filler or reinforcing agent.

Stock B was the same as A excepting that 200 g. of oven-dried wheat starch was dry milled into 1000 g. of the gum rubber.

Stock C was prepared by stirring 200 g. (dry basis) of ordinary ungelatinized wheat starch into 2320 g. of Type 2000 SBR latex containing 43.0% latex solids. The slurry was precipitated with 300 ml. M $ZnSO_4$. The poorly filterable coagulum nonhomogenously comprising the unruptured granular starch was cut into small pieces, dried for 24 hours in a vacuum oven, milled into a mass, masticated with the tabulated additives, and vulcanized to rubber that essentially duplicated Stock B.

Stock D was prepared by mixing during 1 hour of cooling approximately 3200 ml. of 90° C. dilute NaOH solution containing 200 g. of fully gelatinized starch with 2320 g. of Type 2000 SBR latex. The starch and rubber solids were then coprecipitated by the extremely gradual addition of 2 volumes of absolute ethanol. However, the precipitated material was not homogenous, the initial coagulum appearing to be mostly rubber whereas that formed near the end of the addition appeared to consist practically entirely of starch. The filtered pooled coagulum was dried overnight in a forced draft oven. The dry coagulum was milled into a sheet, masticated with the conventional additives, and then vulcanized. It was noted that mastication failed to disperse small horny starch agglomerates which also conspicuously marred the vulcanized product.

Stock E was prepared by mixing a starch solution and SBR latex precisely as for Stock D, but then instead of precipitating the solids with ethanol, the entire mixed solution was dried in an 80° C. forced draft oven during the course of 99 hours, the successive formations of surface skin being periodically removed to permit further drying. As the skin material was accumulated it was cut into small pieces and thoroughly dried. Then the pooled material was milled into a sheet, masticated with the tabulated additives, and heat cured under the same conditions used for the other specimens. The vulcanizate was highly alkaline and darkly colored. It also analyzed 5.37% inorganic ash.

Stock F, representing an operative embodiment of our invention, precisely paralleled the preparation of Stock D to the extent that 200 g. of unmodified wheat starch (dry basis) was suspended in 2500 ml. water and in the added presence of 40 g. of 50% NaOH cooked for 1 hour at 90° C. to form a clear solution of fully gelatinized starch, said solution then being diluted with 500 ml. water, added to 2320 g. of Type 2000 SBR latex, and the mixture stirred for 1 hour while cooling to room temperature. Instead of coprecipitating the solids with ethanol as in Stock D, we poured 630 ml. of M $ZnSO_4$ solution into the vigorously stirred mixture. After filtering and oven-drying the resulting curds, they were consolidated into a sheet by three passes through a laboratory model differential roll mill set at a nip clearance of 0.01 inch, followed by 6 minutes of differential roll milling through a relaxed nip, the speed of the slower (front) roll being 24 ft./min. to provide a shear ratio of 1:1.4. Stock F was then compounded and cured.

TABLE III

| | Stock | | | | | |
|---|---|---|---|---|---|---|
| | A | B | C | D | E | F |
| | Parts by Weight | | | | | |
| Compound: | | | | | | |
| SBR | 100.0 | 100.0 | 100.0 | 100.0 | 100.0 | 100.0 |
| Starch | 0.0 | 20.0 | 20.0 | 19.0 | 20.0 | 18.1 |
| Zinc, as oxide (from $ZnSO_4$) | 0.0 | 0.0 | 1.5 | 0.0 | 0.0 | 4.5 |
| Zinc oxide per se | 5.0 | 5.0 | 3.5 | 5.0 | 5.0 | 0.5 |
| Stearic acid | 2.0 | 2.0 | 2.0 | 2.0 | 2.0 | 2.0 |
| Sulfur | 2.0 | 2.0 | 2.0 | 2.0 | 2.0 | 2.0 |
| Phenyl-β-naphthylamine | 1.0 | 1.0 | 1.0 | 1.0 | 1.0 | 1.0 |
| Benzothiazyl disulfide | 1.5 | 1.5 | 1.5 | 1.5 | 1.5 | 1.5 |
| Tetramethylthiuram disulfide | 0.2 | 0.2 | 0.2 | 0.2 | 0.2 | 0.2 |
| Total | 111.7 | 131.7 | 131.7 | 130.7 | 131.7 | 129.8 |
| Press cure, 30 minutes at 300° F | | | | | | |
| Physical properties: | | | | | | |
| Modulus, 300% elongation, p.s.i. | 275 | 300 | 320 | | 634 | 875 |
| Tensile strength, p.s.i. | 345 | 300 | 385 | 520 | 690 | 1,320 |
| Ultimate elongation, percent | 355 | 300 | 315 | 260 | 320 | 425 |
| Angle tear, lbs./in. | 32 | | | 77 | 75 | 118 |
| Appearance | (1) | (1) | (1) | (1) | (2) | (3) |

[1] Opaque.
[2] Dark, opaque.
[3] Light, transparent.

EXAMPLE 4

Another series of starch-reinforced rubbers were prepared by the procedure used for Stock F of Example 3 excepting that predetermined maximum of gelatinized wheat starch that could be quantitatively coprecipitated with a particular latex were employed. The composition and curing of these stocks that were prepared in accordance with our invention are shown in Table IV whereas their mechanical properties are compared in Table V with those of the same rubbers containing respectively no reinforcing agent and a conventional furnace black.

TABLE IV

| | Stock, Latex Type | | | |
|---|---|---|---|---|
| | SBR 2000 | Natural | Nitrile | Carboxylic ("Chemigum 550," Goodyear) |
| | Parts by Weight | | | |
| Compound: | | | | |
| Elastomer | 100.0 | 100.0 | 100.0 | 100.0 |
| Starch | 18.1 | 14.6 | 18.6 | 31.2 |
| Zinc, as oxide (from $ZnSO_4$) | 3.7 | 1.6 | 1.0 | 3.1 |
| Zinc oxide, per se | 1.3 | 3.4 | 4.0 | 1.9 |
| Stearic acid | 2.0 | 2.0 | 2.0 | 2.0 |
| Plasticizer | 2.0 | None | 3.2 | None |
| Antioxidant | 1.0 | 1.0 | 1.0 | 1.0 |
| Sulfur | 2.0 | 2.8 | 1.8 | 1.8 |
| Benzothiazyl disulfide | 1.5 | 1.0 | 1.5 | 1.5 |
| Tetramethylthiuram disulfide | 0.2 | 0.1 | 0.1 | 0.1 |
| Total | 131.8 | 126.5 | 133.2 | 142.6 |
| Optimum press cure, Minutes at 300° F | 30 | 20 | 30 | 20 |

TABLE V

| Elastomer | Reinforcing Agent | | Modulus, at 300% Elongation, p.s.i. | Tensile Strength, p.s.i. | Ultimate Elongation, percent |
|---|---|---|---|---|---|
| | Type | Parts, per 100 rubber | | | |
| SBR 2000 | None | | 275 | 345 | 355 |
| | Starch | 18.1 | 875 | 1,320 | 425 |
| | SRF black | 20 | 580 | 1,125 | 460 |
| | HAF black | 18 | 640 | 1,390 | 475 |
| Natural rubber | Starch | 14.6 | 535 | 3,180 | 615 |
| Nitrile rubber | None | | 290 | 325 | 315 |
| | Starch | 18.6 | 875 | 2,145 | 570 |
| | FT black | 25.2 | 300 | 500 | 370 |
| Carboxylic rubber | None | | 1,070 | 550 | |
| | Starch | 31.2 | 2,415 | 2,985 | 370 |
| | SRF black | 30 | 1,320 | 1,550 | 275 |

EXAMPLE 5

This example illustrates the effects of progressively greater incorporations of starch (up to 100 parts starch per 100 parts of the rubber) using the starch xanthate of Example 1 and Type 2000 SBR rubber. As in the other examples using the distinctly alkaline starch xanthate solution, the mixtures after being stirred for 1 hour to allow the latex particles to adsorb the starch particles, were partially neutralized with M $H_2SO_4$ and then adjusted to an isoelectric pH of 6.8 with M $ZnSO_4$, the proportions of acid and zinc being selected where possible to provide 5 parts of zinc, calculated as the oxide, per 100 parts by weight of rubber. Each sample was then compounded with ZnO (if needed to adjust to 5 parts), 2 parts sulfur, 1 part phenyl-β-naphthylamine, 1.5 parts benzothiazyl disulfide, and 0.2 part of tetramethylthiuram disulfide per 100 parts of the SBR solids, and vulcanized at 300° F. for 30 minutes in a heated press. For comparison, other specimens were prepared containing approximately equivalent proportions of conventional furnace blacks. The data set forth in Table VI show that starch xanthate especially reinforces the modulus and tear strength values which are known to relate more directly to wear resistance than do the tensile strength and ultimate elongation values.

TABLE VI

| Reinforcing Agent | | | | | | |
|---|---|---|---|---|---|---|
| Type | Parts per 100 SBR by Wt. | Volumes | Ultimate Elongation, percent | Tensile Strength, p.s.i. | Modulus, at 300% Elongation, p.s.i. | Tear Strength lbs./in. |
| None | 0 | 0 | 355 | 345 | 275 | 32 |
| Starch | 7.5 | 5 | 365 | 715 | 505 | 62 |
| SRF black | 9.0 | 5 | 455 | 800 | 450 | 52 |
| HAF black | 9.0 | 5 | 460 | 925 | 355 | 61 |
| Starch | 15 | 10 | 425 | 925 | 600 | 89 |
| SRF black | 18 | 10 | 445 | 1,125 | 580 | 70 |
| HAF black | 18 | 10 | 475 | 1,390 | 640 | 110 |
| Starch | 22.5 | 15 | 410 | 1,020 | 715 | 97 |
| SRF black | 27 | 15 | 430 | 1,135 | 705 | 76 |
| HAF black | 27 | 15 | 385 | 1,665 | 1,030 | 118 |
| Starch | 30 | 20 | 445 | 1,215 | 940 | 116 |
| SRF black | 36 | 20 | 440 | 1,550 | 900 | 82 |
| Starch | 45 | 30 | 390 | 1,570 | 1,260 | 104 |
| SRF black | 54 | 30 | 350 | 2,250 | 1,700 | 95 |
| Starch | 75 | 50 | 310 | 950 | 900 | |
| Do | 100 | 67 | 220 | 650 | | |

EXAMPLE 6

This example illustrates the unexpected synergistic reinforcement effects on SBR of combinations of a starch derivative and lignin, which combinations provide greater strength values than are given by equivalent weight loadings with either reinforcing agent alone. Thus, as shown in Table VII, the incorporation of 40 parts by volume of an equal volume mixture of "Cato-8," (a cationic starch available from National Starch Products Co., New York city) and "Indulin B" (T.M. for a sodium lignate available from West Virginia Pulp and Paper Co., Charleston, S.C.) gave a higher tensile strength and a much higher modulus than given by 40 parts of either agent alone. Similarly, a mixture of 20 parts each of starch xanthate and the lignate gave a much higher modulus than was given with 40 parts of either agent alone, and the tensile value exceeded an additive value. In effect, suitable combinations of starch xanthate and lignin, e.g., 30:10 provide the superior reinforcement characteristic of a 40 parts reinforcement with SRF black. Furthermore, the coprecipitation of the rubber with combinations of lignin and a starch derivative were distinctly more complete than the inefficient coprecipitations with lignin alone, which in combination with the less easily filterable nature of the resulting lignin-rubber curds was partly responsible for the rubber industry's substantial abandonment of lignin as a reinforcing agent.

TABLE VII.—PHYSICAL PROPERTIES OF LIGNIN-STARCH REINFORCED RUBBERS

| Parts by wt. per 100 parts SBR | | | | Ultimate Elongation, percent | Modulus, at 300% Elongation, p.s.i. | Tensile Strength, p.s.i. |
|---|---|---|---|---|---|---|
| Starch Xanthate | Cato 8 | Lignin | SRF Black | | | |
| 60 / 40 [1] | | | | 400 | 1,190 | 1,570 |
| | 60 / 40 | | | 410 | 975 | 1,140 |
| | | 52 / 40 | | 730 | 500 | 2,230 |
| | | | 72 / 40 | 310 | 2,430 | 2,580 |
| | 30 / 20 | 26 / 20 | | 505 | 1,232 | 2,609 |
| 30 / 20 | | 26 / 20 | | 380 | 1,680 | 2,050 |
| 45 / 30 | | 13 / 10 | | 340 | 2,335 | 2,630 |

[1] Lower value of each pair is parts by volume.

EXAMPLE 7

This example shows the marked resistances of the starch xanthate-reinforced rubber to prolonged immersion in water as well as to organic solvents as exemplified by benzene.

4020 g. of the 10% aqueous starch xanthate solution of Example 1 was vigorously stirred into 1577 g. of Type 2105 SBR latex containing 63.4% of elastomer solids. The crumb rubber obtained by filtration and drying of the coagulum that was precipitated by $ZnSO_4$ as in Example 1 was compounded and cured with the additives shown in the right hand column of Table I excepting that the level of incorporated starch was raised to 40.2 parts by weight (26.8 parts by volume) instead of 30 parts per 100 parts by weight of the rubber as in Example 1.

For comparison, a similar product was prepared with a conventional MPC (medium processing channel black) instead of the starch xanthate, the 28.9 parts by volume MPC loading (equivalent to 52.0 parts MPC by weight) being roughly comparable to the 26.8 parts by volume loading with starch xanthate in the experimental rubber. Trimmed blocks of the MPC-reinforced vulcanizate and of the starch-reinforced product of the invention were identically subjected to 70 hours of immersion in water and in benzene at 72° C. for 70 hours as set forth in ASTM D471–63T. Whereas an unreinforced vulcanizate containing neither the xanthate nor the channel black showed displacement increases of 16.54% and 387.6% in water and benzene, respectively, and suffered a 8.1% loss in tensile strength (water immersion), while the corresponding swellings of the MPC-rubber were 1.34% and 322.8% coupled with a 2.7% loss of tensile strength in the water-immersion specimen, the corresponding results for the starch xanthate specimens, respectively, were 13.89%, 215.6%, and 5.2%.

We claim:

1. Reinforced vulcanized white rubber characterized by 300% elongation modulus values of about 500 p.s.i. to about 1260 p.s.i., a tensile value of about 715 p.s.i. to about 3180 p.s.i., an angle tear value of about 62 lbs./in. to about 172 lbs./in., a Shore hardness value of about 55 to about 76, said rubber being the product obtained by intimately mixing a latex of an elastomer selected from the group consisting of natural rubber, styrene-butadiene rubber, butadiene-acrylonitrile rubber, and chlorinated rubber with an aqueous solution containing 7.5–100 parts based on 100 parts by weight of the elastomer solids of colloidal polysaccharide particles selected from those of fully gelatinized wheat starch and starch xanthate having a xanthate D.S. of about 0.08, adding sufficient $ZnSO_4$ to the resulting milky mixture to substantially completely coprecipitate the solids therefrom in the form of nontacky readily filterable curds, filtering and oven drying the curds, masticating and milling the dry curds to reverse the elastomer and polysaccharide phases, uniformly incorporating therein conventional curing and vulcanizing agents, rubber lubricants, antioxidants, and about 60 parts based on 100 parts of the elastomer weight of white pigment selected from the group consisting of ZnO, $TiO_2$, and mixtures thereof, and vulcanizing the resulting white rubber at about 300° F.

2. A white rubber as defined in claim 1, said rubber being characterized by a tensile value of 2145 and a 300% modulus value of 875 p.s.i., and wherein the latex is that of nitrile rubber, and the colloidal polysaccharide particles are those of fully gelatinized wheat starch, said starch particles being present to the extent of 18.6 parts by weight per 100 parts of said rubber.

3. A white rubber as defined in claim 1, said rubber being characterized by a tensile value of 2430 p.s.i., a 300% modulus value of 1240 p.s.i., and an angle tear value of 172 lbs./in., and wherein the latex is that of natural rubber and the colloidal polysaccharide particles are those of 0.08 D.S. starch xanthate, said starch xanthate being present to the extent of 32 parts by weight per 100 parts of said rubber.

4. A white rubber as defined in claim 1, said rubber being characterized by a tensile value of 1570 p.s.i., a 300% modulus value of 1260, and an angle tear value of 104 lbs./in., and wherein the latex is that of styrene-butadiene rubber, and the polysaccharide particles are those of 0.08 D.S. starch xanthate, said starch xanthate being present to the extent of 45 parts by weight per 100 parts of said rubber.

5. A white rubber as defined in claim 1, said rubber being characterized by a tensile value of 1305 p.s.i., a 300% modulus value of 1134 p.s.i., and an angle tear value of 131 lbs./in., and wherein the latex is that of styrene-butadiene rubber, and the polysaccharide particles are those of 0.08 D.S. starch xanthate, said starch xanthate being present to the extent of 45 parts by weight per 100 parts of said rubber, the added pigment consisting of 20 parts of ZnO and 25 parts of $TiO_2$ per 100 parts by weight of said rubber.

6. In the process of preparing lignin-reinforced rubber by coagulation, the improvement comprising the step of adding to the lignin/rubber dispersion prior to the coagulation step from about 1 part to about 3 parts based on the dry lignin weight of dispersed starch xanthate solids having a zanthate D.S. of about 0.08.

References Cited

UNITED STATES PATENTS

| | | | |
|---|---|---|---|
| 2,348,165 | 5/1944 | Buchanan | 260—821 |
| 2,945,826 | 7/1960 | Everett | 260—2.5 |
| 3,107,225 | 10/1963 | Rogers | 260—2.5 |
| 3,113,605 | 12/1963 | Fuetterer | 152—211 |

OTHER REFERENCES

Editors, Rubber World, "Materials and Compounding Ingredients for Rubber and Plastics," 1965 ed. page 498.

WILLIAM H. SHORT, *Primary Examiner.*

E. NIELSEN, *Assistant Examiner.*

U.S. Cl. X.R.

260—749, 17.5, 735.